7338X
J. BUCH.
Plow.
Patented Dec. 28, 1832.
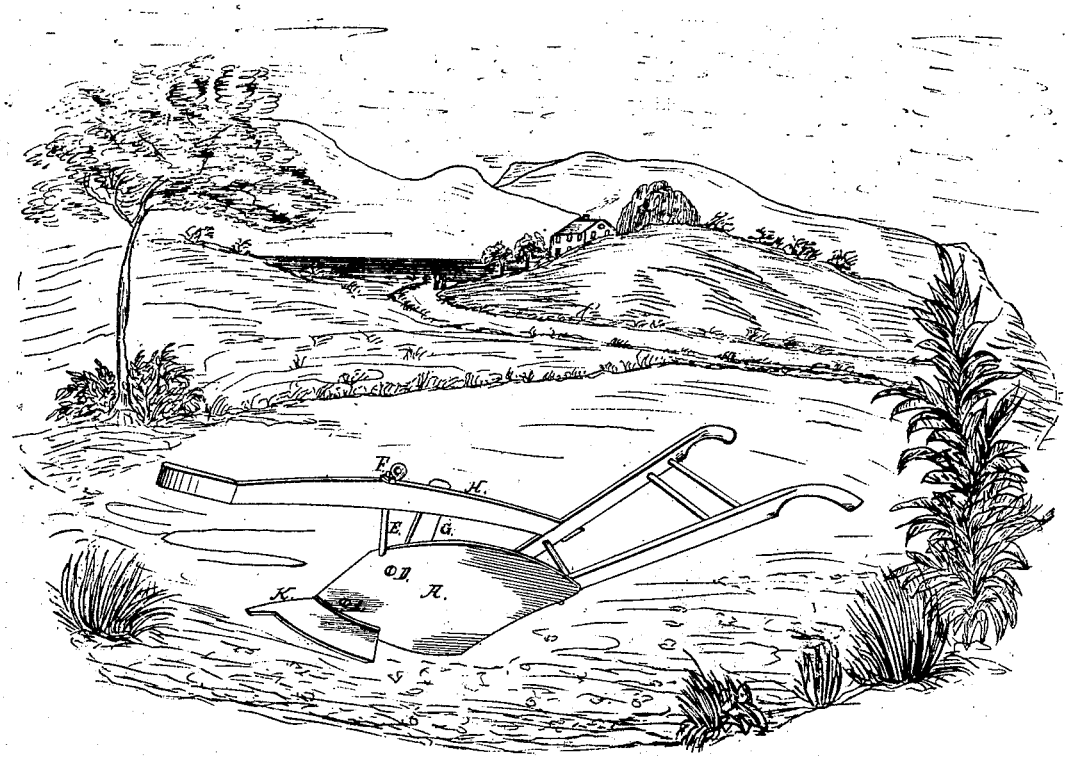
Mould board view.
Land side view.
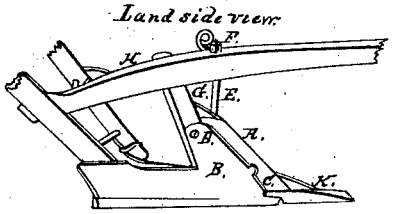
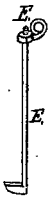
Bottom view.
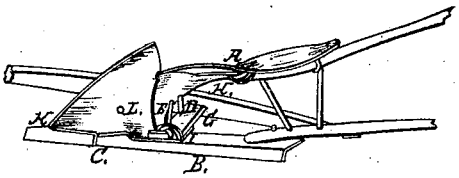
AM. PHOTO-LITHO. CO. N.Y. (OSBORNE'S PROCESS.)

7338X

UNITED STATES PATENT OFFICE.

JOHN BUCH, OF FAIRFIELD, OHIO.

IMPROVEMENT IN PLOWS.

Specification forming part of Letters Patent dated December 28, 1832.

*To all whom it may concern:*

Be it known that I, JOHN BUCH, of Fairfield, Ohio, have invented an Improvement in Plows, of which the following is a specification.

The landside and mold-board are both of cast-iron, and, as will be seen in the model, are separate and detached pieces. They are fastened together at the lower end of the plow by a lock, and at the upper end by a screw passing through the landside, sheth, and mold-board. The landside and mold-board, it will be seen, are retained in their proper relative positions and made secure by a large screw passing from the bottom of the plow through the mold-board and beam, to which it is fastened by a tap. It will also be observed that the sheth passes up through the beam, and is made fast to the landside of the plow by an iron loop, which forms a part of said landside.

This improvement I claim as one entirely novel, and it has the effect of rendering the whole architecture of the machine more firm, consolidated, and secure than any other now in use, and is so considered by a number of practical men who have tested its operation. The share is movable and of wrought-iron, and is attached to the plow in the manner as represented in the model. The advantage of this is obvious, as when necessity requires it can be taken off to be either sharpened or steeled.

The manner in which the share is attached to the mold-board and secured to the landside differs from all other plows I have ever seen, and will be particularly observed by referring to the model.

The model, it will be further observed, is that of a left-hand plow. I also manufacture them right-handed, differing in no other particular from the model herewith submitted, both of which kinds I wish to be embraced in the Letters Patent.

Given under my hand this 10th day of August, 1832.

JOHN BUCH.

Witnesses:
JOHN WRIGHT,
WM. I. REESE.